United States Patent
Satish et al.

(10) Patent No.: US 9,330,258 B1
(45) Date of Patent: May 3, 2016

(54) SYSTEMS AND METHODS FOR IDENTIFYING UNIFORM RESOURCE LOCATORS THAT LINK TO POTENTIALLY MALICIOUS RESOURCES

(71) Applicant: Symantec Corporation, Mountain View, CA (US)

(72) Inventors: Sourabh Satish, Fremont, CA (US); Jingjing Ren, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 168 days.

(21) Appl. No.: 14/041,826

(22) Filed: Sep. 30, 2013

(51) Int. Cl.
*H04L 9/32* (2006.01)
*H04L 29/06* (2006.01)
*G06F 21/56* (2013.01)

(52) U.S. Cl.
CPC ............ *G06F 21/56* (2013.01); *H04L 63/1408* (2013.01); *H04L 63/1416* (2013.01); *H04L 63/1441* (2013.01); *H04L 63/14* (2013.01); *H04L 63/145* (2013.01)

(58) Field of Classification Search
CPC ... H04L 63/14; H04L 63/1408; H04L 63/114; H04L 63/145; H04L 63/1483
USPC ...................................................... 726/22–25
See application file for complete search history.

(56) References Cited

U.S. PATENT DOCUMENTS

| | | | |
|---|---|---|---|
| 7,496,962 B2 * | 2/2009 | Roelker et al. ................... | 726/23 |
| 7,540,025 B2 * | 5/2009 | Tzadikario ...................... | 726/22 |
| 8,650,648 B2 * | 2/2014 | Howard et al. .................. | 726/24 |
| 8,695,096 B1 * | 4/2014 | Zhang .............................. | 726/24 |
| 8,745,731 B2 * | 6/2014 | Achan et al. ..................... | 726/22 |
| 8,826,438 B2 * | 9/2014 | Perdisci et al. .................. | 726/24 |
| 2006/0107321 A1 * | 5/2006 | Tzadikario ....................... | 726/22 |
| 2008/0172382 A1 * | 7/2008 | Prettejohn ......................... | 707/6 |
| 2008/0276316 A1 * | 11/2008 | Roelker et al. .................. | 726/23 |
| 2009/0249484 A1 * | 10/2009 | Howard ................ | G06F 21/567 726/24 |
| 2009/0287653 A1 * | 11/2009 | Bennett ................. | H04L 63/145 |
| 2011/0283361 A1 * | 11/2011 | Perdisci et al. .................. | 726/24 |
| 2012/0102545 A1 * | 4/2012 | Carter, III ......... | G06F 17/30864 726/3 |
| 2012/0304287 A1 * | 11/2012 | Yu ........................... | G06F 21/56 726/22 |
| 2013/0298240 A1 * | 11/2013 | Gerber .................... | G06F 21/56 726/23 |
| 2014/0298460 A1 * | 10/2014 | Xue et al. ......................... | 726/23 |
| 2015/0007312 A1 * | 1/2015 | Pidathala et al. ............... | 726/22 |
| 2015/0082424 A1 * | 3/2015 | Shukla ............................ | 726/22 |

* cited by examiner

*Primary Examiner* — Tae Kim
(74) *Attorney, Agent, or Firm* — ALG INTELLECTUAL PROPERTY, LLC

(57) ABSTRACT

A computer-implemented method for identifying URLs that link to potentially malicious resources may include (1) compiling a set of URLs that link to at least one potentially malicious resource, (2) identifying a common pattern of characters included in the set of URLs that link to the potentially malicious resource, (3) deriving a regular expression capable of being used to identify additional URLs that link to one or more potentially malicious resources based at least in part on the common pattern of characters, and then (4) identifying at least one additional URL that links to at least one potentially malicious resource by (i) applying the regular expression to the additional URL and then (ii) determining that the additional URL links to the potentially malicious resource based at least in part on applying the regular expression to the additional URL. Various other methods, systems, and computer-readable media are also disclosed.

20 Claims, 9 Drawing Sheets

```
                              Set of URLs
                                  120
------------------------------------------------------------------------
************************************************ http://findfreemediaonline.com/files/7e799757b9854ba457493470d2055b3cdownload.php?get&
file_id=gs58ac 852ch17i0&advert=149&sub=0&site=206&filename=fade%20out%207%27.zip&name
=fade_out_7%27.zip&data=v2NPHHENgqDjv2BTCC1weVZPn1d5miyNt%2BYfjkb8SSNftpoYo7HncbIA
BPHTWs%2Fgc6TV%2BIspzpecN%2FyVII8%2FMg%3D%3D&ip=110.3.37.74&country=JP http://a.cloudfiftyfive.com/NCIC/20121204074753494E434647493032_d0e451a4-3f8f-4b17-85b7-
dbb0f48ff54f%5C201212040906584737f5-0681-4da8-bb54-ee86c9470c2e/Setup.exe http://4beaf.bablosecures.com/load/secure_2022_br s2.exe http://findfreemediaonline.com/files/6eef41e7803152ab0284bdaf98db2b2b/download.php?get&
file_id=gs58ac852ch17i0&advert=149&sub=0&site=206&filename=fade%20out%207%27.zip&name
=fade_out_7%27.zip&data=8oZEvGwtMK1I7iX8Pu19WY2VdbPlf%2BK6XqRLxuQhxjC01ARHramrnDx
GvRd%2F4%2FMd8NAZk04P89nMdrOHorRrTA%3D%3D&ip=110.3.37.74&country=JP http://0005d.bablosecures.com/load/secure_2013_brs8.exe http://a.spikeyspikeweed.com/NCIC/201206091327534 94E434647493032_a2a2fcc7-f7d5-47ff-9236-
d904d66a54e3/2012060917184e7c25fd-20e8-4dc4-bcbf-a65f6e15f8d4/Setup.exe
                                    •
                                    •
                                    •
************************************************
------------------------------------------------------------------------
```

FIG. 4

Subset of similar URLs
500

**************************************************** http://findfreemediaonline.com/files/7e799757b9854ba457493470d2055b3c/download.php?get&
file_id=gs58ac852ch17i0&advert=149&sub=0&site=206&filename=fade%20out%207%27.zip&name
=fade_out_7%27.zip&data=v2NPHHENgqDjv2BTCC1weVZPn1d5miyNt%2BYfjkb8SSNftpoYo7HncbIAB
PHTWs%2Fgc6TV%2BIspzpecN%2FyVII8%2FMg%3D%3D&ip=110.3.37.74&country=JP http://findfreemediaonline.com/files/6eef41e7803152ab0284bdaf98db2b2b/download.php?get&
file_id=gs58ac852ch17i0&advert=149&sub=0&site=206&filename=fade%20out%207%27.zip&name
=fade_out_7%27.zip&data=8oZEvGwtMK1I7iX8Pu19WY2VdbPIf%2BK6XqRLxuQhxjC01ARHramrnDxG
vRd%2F4%2FMd8NAZk04P89nMdrOHorRrTA%3D%3D&ip=110.3.37.74&country=JP

⋮

****************************************************

Subset of similar URLs
502

**************************************************** http://a.cloudfiftyfive.com/NCIC/20121204074753494E434647493032_d0e451a4-3f8f-4b17-85b7-
dbb0f48ff54f%5C201212040906584737f5-0681-4da8-bb54-ee86c9470c2e/Setup.exe http://a.spikeyspikeweed.com/NCIC/20120609132753494E434647493032_a2a2fcc7-f7d5-47ff-9236-
d904d66a54e3/2012060917184e7c25fd-20e8-4dc4-bcbf-a65f6e15f8d4/Setup.exe

```
                          Regular Expression
                                 600
----------------------------------------------------------------------
***********************************************

DERIVED FROM:       Subset of Similar URLs 500

CHARACTER STRING 1: http://findfreemediaonline.com/files/

CHARACTER STRING 2: /download.php?get&file_id=gs58ac852ch17i0&advert=149&sub=0&site=206
                    &filename=fade%20out%207%27.zip&name=fade_out_7%27.zip&data=

CHARACTER STRING 3: %3D%3D&ip=110.3.37.74&country=JP

***********************************************
----------------------------------------------------------------------
```

```
                          Regular Expression
                                 602
----------------------------------------------------------------------
***********************************************

DERIVED FROM:       Subset of Similar URLs 502

CHARACTER STRING 1: http://a.

CHARACTER STRING 2: .com/NCIC/20121204074753494E434647493032_

GENERIC PATTERN 1:  -XXXX-XXXX-XXXX-

GENERIC PATTERN 2:  -XXXX-XXXX-XXXX-

CHARACTER STRING 3: /Setup.exe

URL
700 http://findfreemediaonline.com/files/4d02910397583ae489402874d2984a2c/download.php?get&
file_id=gs58ac852ch17i0&advert=149&sub=0&site=206&filename=fade%20out%207%27.zip&name
=fade_out_7%27.zip&data=r3MFEUWFpuAio3BOEW2pqVSSm1d4pioNq%4PUtklf9PUQqejIq8amlfkkIAE
MOFs%4Rml5MN%3PsielmzpV%3PwSil9%4MAc%3D%3D&ip=110.3.37.74&country=JP

URL
702 http://a.spammyspamfile.com/NCIC/20121204074753494E434647493032_s7a353b2-7e5e-6c9a-15c8-
ead0d57fc61a%7E2012121578036571160a1-1085-2af1-ab55-ce73a8361a2f/Setup.exe

FIG. 7

SYSTEMS AND METHODS FOR IDENTIFYING UNIFORM RESOURCE LOCATORS THAT LINK TO POTENTIALLY MALICIOUS RESOURCES

BACKGROUND

Malicious programmers may distribute malicious resources (such as malware) in a variety of ways. For example, a malicious programmer may use a malware propagation kit (such as BLACKHOLE or REDKIT) to infect a website and distribute malware to users that visit the infected website. Additionally or alternatively, the malicious programmer may pay the owner of the website to host and distribute the malware from his or her website.

The malicious programmer may also modify the website such that the malware is downloadable only by users that accesses a specific redirection link. For example, an unsuspecting user may click on a specific GOOGLE search result or FACEBOOK post that redirects the user to a "one-time" Uniform Resource Locator (URL). This "one-time" URL may trigger a download of the malware from the website only once. Unfortunately, while the user may unknowingly download the malware from the website upon clicking the GOOGLE search result or FACEBOOK post, malware analysts may have difficulty reproducing the same infection for diagnostic purposes since the URL that triggers the download is "one-time" only.

As such, the instant disclosure identifies and addresses a need for improved systems and methods for identifying URLs that link to potentially malicious resources.

SUMMARY

As will be described in greater detail below, the instant disclosure generally relates to systems and methods for identifying URLs that link to potentially malicious resources by deriving one or more regular expressions from a set of known-malicious URLs and then applying these regular expressions to one or more additional URLs encountered by a computing device.

In one example, a computer-implemented method for identifying URLs that link to potentially malicious resources may include (1) compiling a set of URLs that link to at least one potentially malicious resource, (2) identifying a common pattern of characters included in the set of URLs that link to the potentially malicious resource, (3) deriving a regular expression capable of being used to identify additional URLs that link to one or more potentially malicious resources based at least in part on the common pattern of characters included in the set of URLs, and then (4) identifying at least one additional URL that links to at least one potentially malicious resource by (i) applying the regular expression to the additional URL and then (ii) determining that the additional URL links to the potentially malicious resource based at least in part on applying the regular expression to the additional URL.

In some examples, the method may also include detecting at least one attempt by a user device to access the additional URL that links to the potentially malicious resource. In such examples, the method may further include blocking the attempt to access the additional URL before the user device encounters the potentially malicious resource via the additional URL.

In some examples, the method may also include determining that at least one security agent installed on a set of user devices has encountered the potentially malicious resource. In such examples, the method may further include identifying each URL at which the security agent installed on the set of user devices has encountered the potentially malicious resource. Additionally or alternatively, the method may include compiling a set of URLs that includes each URL at which the security agent has encountered the potentially malicious resource.

In some examples, the method may also include grouping the set of URLs into subsets based at least in part on similarity. For examples, the method may include comparing at least one URL in the set of URLs with at least one other URL in the set of URLs. In this example, the method may further include determining that the URL and the other URL exceed a threshold level of similarity relative to one another based at least in part on the comparison. Additionally or alternatively, the method may include forming a subset of similar URLs that includes the URL and the other URL in response to determining that the URL and the other URL exceed the threshold level of similarity.

In one example, the method may also include identifying the common pattern of characters included in the subset of similar URLs. In this example, the method may further include deriving a regular expression capable of being used to identify additional URLs that link to the potentially malicious resource based at least in part on the common pattern of characters included in the subset of similar URLs.

In one example, the method may also include comparing at least one additional URL in the set of URLs with at least one further URL in the set of URLs. In this example, the method may further include determining that the additional URL and the further URL exceed a threshold level of similarity relative to one another based at least in part on the comparison. Additionally or alternatively, the method may include forming another subset of similar URLs that includes the additional URL and the further URL in response to determining that the additional URL and the further URL exceed the threshold level of similarity.

In one example, the method may also include identifying the common pattern of characters included in the other subset of similar URLs. In this example, the method may further include deriving a regular expression capable of being used to identify additional URLs that link to the potentially malicious resource based at least in part on the common pattern of characters included in the other subset of similar URLs.

In some examples, the method may also include providing the set of URLs to an expression-derivation tool that derives the regular expression from the set of URLs. Additionally or alternatively, the method may include identifying a URL that facilitates downloading a malicious file. The method may further include detecting at least one attempt by a user device to access the URL that facilitates downloading the malicious file. Finally, the method may include blocking the attempt to access the URL in response to detecting the attempt to access the URL.

In some examples, the method may also include testing the regular expression against one or more non-malicious URLs. In such examples, the method may further include determining that the test of the regular expression resulted in at least one false positive. Additionally or alternatively, the method may include discarding the regular expression to avoid false positives resulting from the regular expression in response to determining that the test of the regular expression resulted in the false positive.

In some examples, the method may also include calculating an amount of false positives that resulted from the test of the regular expression. In such examples, the method may further include determining that the amount of false positives exceeds a predetermined threshold. Additionally or alternatively, the method may include refraining from applying the regular expression to additional URLs due at least in part to the amount of false positives that resulted from the test of the regular expression.

In some examples, the method may also include applying the regular expression at a network layer of a user device. Additionally or alternatively, the method may include applying the regular expression at a network gateway.

In one embodiment, a system for implementing the above-described method may include (1) a compilation module that compiles a set of URLs that link to at least one potentially malicious resource, (2) an expression module that (i) identifies a common pattern of characters included in the set of URLs that link to the potentially malicious resource and then (ii) derives a regular expression capable of being used to identify additional URLs that link to one or more potentially malicious resources based at least in part on the common pattern of characters included in the set of URLs, and (3) a security module that identifies at least one additional URL that links to at least one potentially malicious resource by (i) applying the regular expression to the additional URL and then (ii) determining that the additional URL links to the potentially malicious resource based at least in part on applying the regular expression to the additional URL. The system may also include at least one processor configured to execute the compilation module, the expression module, and the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) compile a set of URLs that link to at least one potentially malicious resource, (2) identify a common pattern of characters included in the set of URLs that link to the potentially malicious resource, (3) derive a regular expression capable of being used to identify additional URLs that link to one or more potentially malicious resources based at least in part on the common pattern of characters included in the set of URLs, and then (4) identify at least one additional URL that links to at least one potentially malicious resource by (i) applying the regular expression to the additional URL and then (ii) determining that the additional URL links to the potentially malicious resource based at least in part on applying the regular expression to the additional URL.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary set of URLs that link to at least one potentially malicious resource.

FIG. 5 is an illustration of exemplary subsets of similar URLs that link to at least one potentially malicious resource.

FIG. 6 is an illustration of exemplary regular expressions capable of being used to identify URLs that link to at least one potentially malicious resource.

FIG. 7 is an illustration of exemplary URLs that link to at least one potentially malicious resource.

Figure 1:
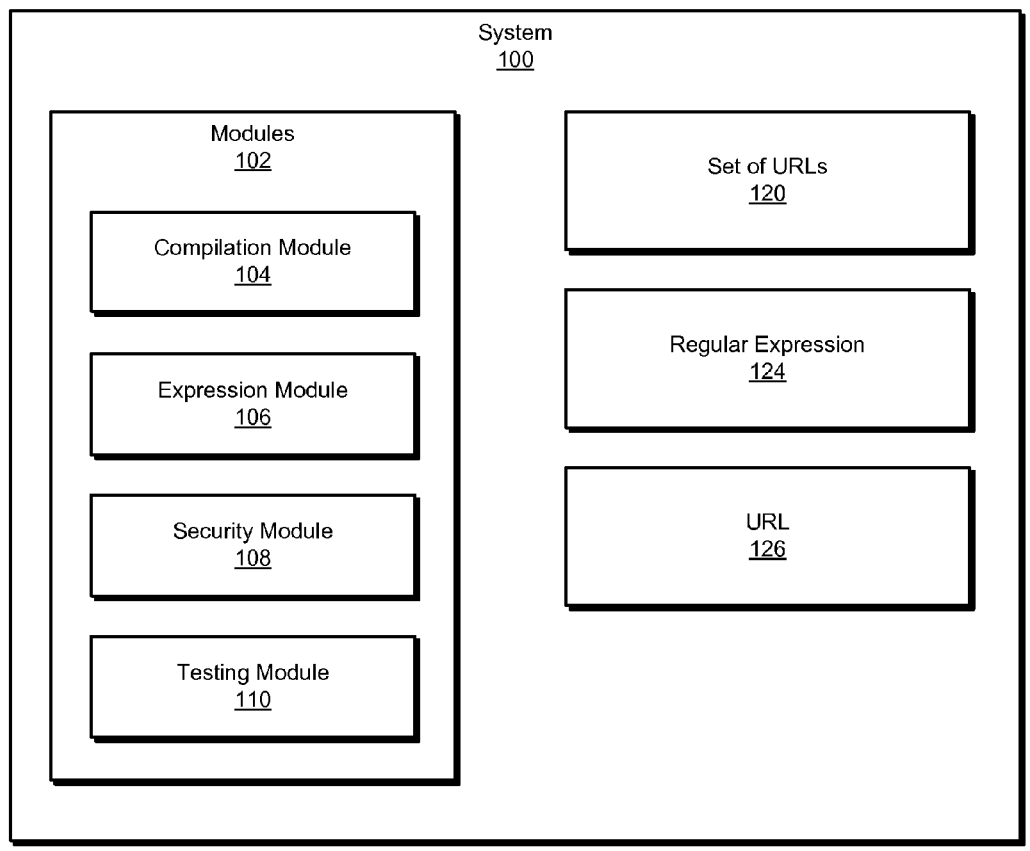
FIG. 1 is a block diagram of an exemplary system for identifying URLs that link to potentially malicious resources.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying URLs that link to potentially malicious resources. As will be explained in greater detail below, by identifying a common pattern of characters included in a set of known-malicious URLs, the various systems and methods described herein may derive a regular expression capable of being used to identify other malicious URLs that include the common pattern of characters. Upon deriving this regular expression, the various systems and methods described herein may identify a "one-time" URL that links to at least one potentially malicious resource by applying the regular expression to this "one-time" URL before any users have triggered a download of the potentially malicious resource from the "one-time" URL. As a result, the various systems and methods described herein may be able to block users' inadvertent attempts to access the malicious "one-time" URL and thus prevent such users from downloading the potentially malicious resource.

Figure 2:
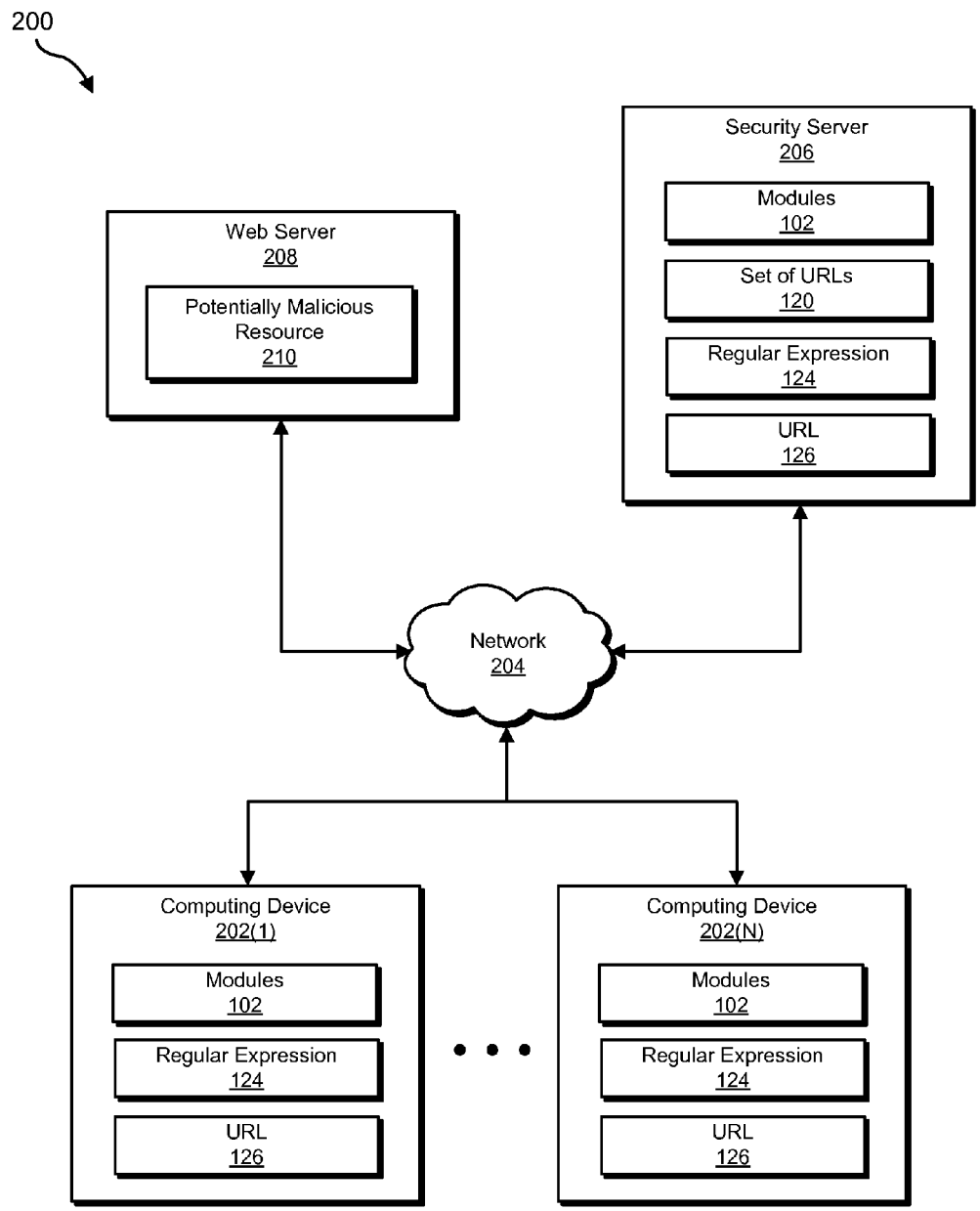
FIG. 2 is a block diagram of an additional exemplary system for identifying URLs that link to potentially malicious resources.

The following will provide, with reference to FIGS. 1-2, detailed descriptions of exemplary systems for identifying URLs that link to potentially malicious resources. Detailed descriptions of corresponding computer-implemented methods will be provided in connection with FIG. 3. Detailed descriptions of exemplary sets of URLs, subsets of similar URLs, regular expressions, and potentially malicious URLs will be provided in connection with FIGS. 4, 5, 6, and 7, respectively. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for identifying URLs that link to potentially malicious resources. As illustrated in this figure, exemplary system 100 may include one or more modules 102 for performing one or more tasks. For example, and as will be explained in greater detail below, exemplary system 100 may include a compilation module 104 that compiles a set of URLs that link to at least one potentially malicious resource. Exemplary system 100 may also include expression module 106 that (1) identifies a common pattern of characters included in the set of URLs that link to the potentially malicious resource and then (2) derives a regular expression capable of being used to identify additional URLs that link to one or more potentially malicious resources based at least in part on the common pattern of characters included in the set of URLs.

In addition, and as will be described in greater detail below, exemplary system 100 may include a security module 108 that identifies at least one additional URL that links to at least one potentially malicious resource by (1) applying the regular expression to the additional URL and then (2) determining that the additional URL links to the potentially malicious resource based at least in part on applying the regular expression to the additional URL. Exemplary system 100 may further include testing module 110 that (1) tests the regular expression against one or more non-malicious URLs, (2) determines that the test of the regular expression resulted in at least one false positive, and then (3) discards the regular expression to avoid false positives resulting from the regular expression in response to determining that the test of the regular expression resulted in the false positive. Although illustrated as separate elements, one or more of modules 102 in FIG. 1 may represent portions of a single module or application (such as SYMANTEC'S NORTON ANTIVIRUS, SYMANTEC'S NETWORK SECURITY, SYMANTEC'S NORTON INTERNET SECURITY, MCAFEE ALL ACCESS, MCAFEE TOTAL PROTECTION, MCAFEE INTERNET SECURITY, F-SECURE ANTI-VIRUS, TITANIUM ANTIVIRUS+SECURITY, and/or KASPERSKY ANTI-VIRUS).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N), security server 206, and/or web server 208), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more sets of URLs, such as set of URLs 120. The term "URL," as used herein, generally refers to any type or form of character string that identifies, references, and/or links to at least one resource (such as an Internet resource). The term "resource," as used herein, generally refers to any type or form of physical or virtual component within a computing environment (such as a computing device and/or the Internet).

In some examples, set of URLs 120 may link to at least one potentially malicious resource. The phrase "malicious resource," as used herein, generally refers to any type or form of resource intended and/or configured to infiltrate a user's computing device without the informed consent of the user. In one example, each URL in set of URLs 120 may link to the same potentially malicious resource. In another example, while some URLs in set of URLS 120 may link to one potentially malicious resource, other URLs in set of URLs 120 may link to another potentially malicious resource.

As illustrated in FIG. 1, exemplary system 100 may also include one or more regular expressions, such as regular expression 124. The phrase "regular expression," as used herein, generally refers to any type or form of search pattern used to identify URLs that satisfy certain criteria. Examples of regular expression 124 include, without limitation, rules, heuristics, policies, sequences of characters, search patterns, algorithms, combinations of one or more of the same, or any other suitable expression used to identify URLs that satisfy certain criteria. In one example, regular expression 124 may include a search pattern used to identify at least one URL whose sequence of characters is similar in one way or another to set of URLs 120.

As illustrated in FIG. 1, exemplary system 100 may also include at least one additional URL, such as URL 126. In one example, URL 126 may link to at least one potentially malicious resource. In this example, URL 126 may be subjected to a security analysis based at least in part on regular expression 124. Upon completion, this security analysis may yield information indicating that URL 126 links to the potentially malicious resource.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among computing devices 202(1)-(N), a security server 206, and/or a web server 208. In one example, computing devices 202(1)-(N) may be programmed with one or more of modules 102. Additionally or alternatively, computing devices 202(1)-(N) may include regular expression 124 and/or URL 126.

In one example, security server 206 may be programmed with one or more of modules 102. Additionally or alternatively, security server 206 may include set of URLs 120, regular expression 124, and/or URL 126.

As shown in FIG. 2, web server 208 may include a potentially malicious resource 210. Examples of potentially malicious resource 210 include, without limitation, malware, computer viruses, computer worms, Trojan horses, spyware, adware, rootkits, files that potentially include one or more of the same, URLs that potentially link to one or more of the same, combinations of one or more of the same, or any other potentially malicious resource. In one example, potentially malicious resource 210 may be linked by and/or accessible via URL 126.

In one embodiment, one or more of modules 102 from FIG. 1 may, when executed by at least one processor of computing devices 202(1)-(N) and/or security server 206, enable one or more of computing devices 202(1)-(N) and/or security server 206 to identify URLs that link to potentially malicious resources. For example, and as will be described in greater detail below, one or more of modules 102 may cause one or more of computing devices 202(1)-(N) and/or security server 206 to (1) compile set of URLs 120 that link to at least one potentially malicious resource, (2) identify a common pattern of characters included in set of URLs 120, (3) derive regular expression 124 capable of being used to identify additional URLs that link to one or more potentially malicious resources based at least in part on the common pattern of characters included in set of URLs 120, and then (4) identify URL 126 as linking to at least one potentially malicious resource by (i) applying regular expression 124 to URL 126 and then (ii) determining that URL 126 links to the potentially malicious resource based at least in part on applying regular expression 124 to URL 126.

Computing devices 202(1)-(N) generally represents any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, user devices, combinations of one or more of the same, exemplary computing system 810 in FIG. 8, or any other suitable computing devices.

Security server 206 generally represents any type or form of computing device capable of deriving, applying, and/or distributing regular expressions. Examples of security server 206 include, without limitation, application servers, web servers, storage servers, and/or database servers configured to run certain software applications and/or provide various security, web, storage, and/or database services.

Web server 208 generally represents any type or form of computing device capable of hosting and/or distributing potentially malicious resources. Examples of web server 208 include, without limitation, application servers, storage servers, backup servers, replication servers, deduplication servers and/or database servers configured to run certain software applications and/or provide various web, storage, backup, replication, deduplication and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication among computing devices 202(1)-(N), security server 206, and/or web server 208.

Figure 3:
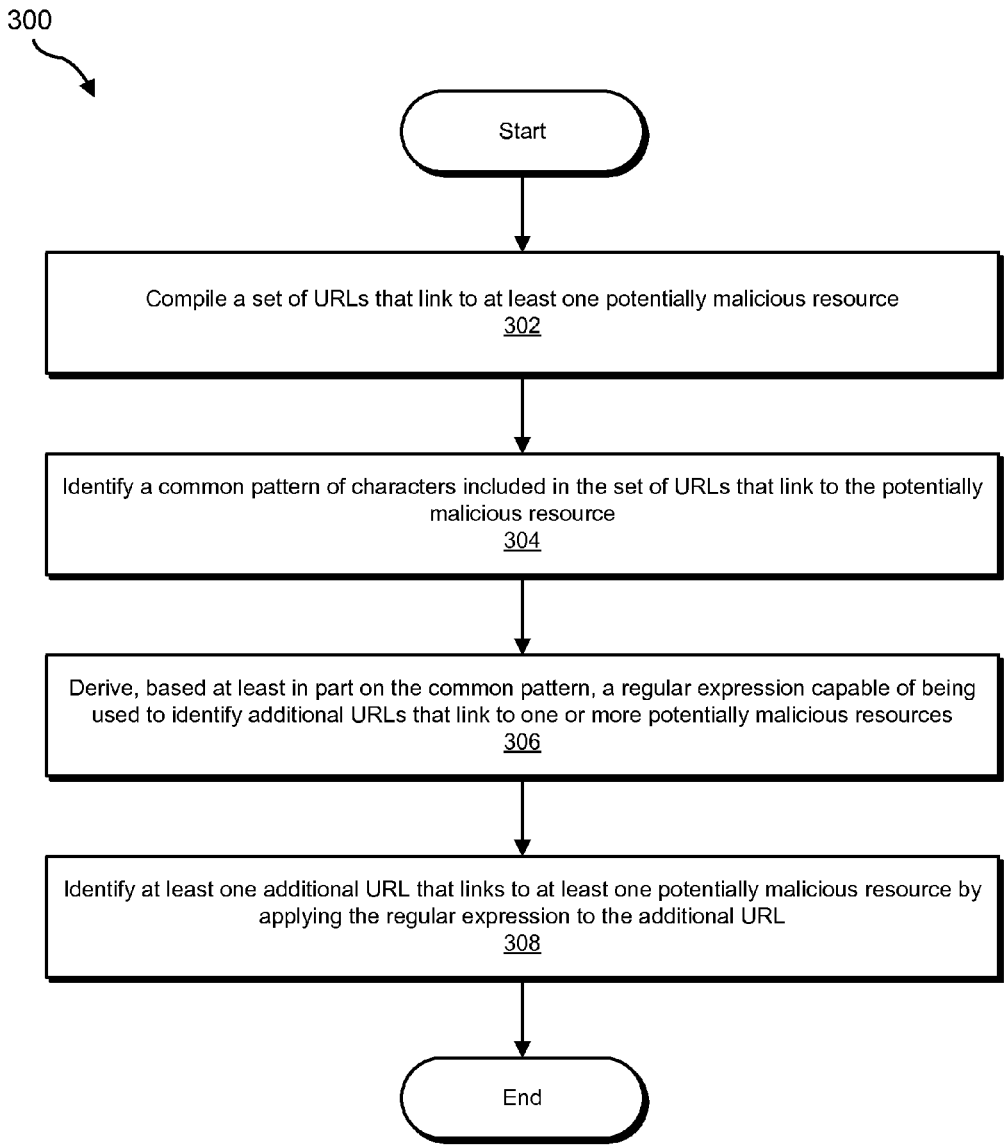
FIG. 3 is a flow diagram of an exemplary method for identifying URLs that link to potentially malicious resources.

FIG. 3 is a flow diagram of an exemplary computer-implemented method 300 for identifying URLs that link to potentially malicious resources. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may compile a set of URLs that link to at least one potentially malicious resource. For example, compilation module 104 may, as part of one or more of computing devices 202(1)-(N) and/or security server 206 in FIG. 2, compile set of URLs 120 that link to at least one potentially malicious resource. In one example, set of URLs 120 may collectively link to a plurality of different malware-infected files. In another example, each URL in set of URLs 120 may link to the same malware-infected file.

The systems described herein may perform step 302 in a variety of ways. In some examples, compilation module 104 may query one or more security agents (not illustrated in FIG. 2) for any URLs that link to one or more known-malicious files. For example, compilation module 104 may, as part of server 206 in FIG. 2, query one or more security agents installed on computing devices 202(1)-(N) for any URLs that have triggered a download of known-malicious file "maliciousexample.exe". In response to the query, the security agents installed on computing devices 202(1)-(N) may search their corresponding download logs for any URLs that triggered a download of the "maliciousexample.exe" file.

During the search of their download logs, a plurality of the security agents installed on computing devices 202(1)-(N) may identify a URL that triggered a download of the "maliciousexample.exe" file. These security agents may then provide each URL that triggered a download of "maliciousexample.exe" to security server 206 via network 204. As security server 206 receives these URLs from the security agents, compilation module 104 may compile set of URLs 120 based at least in part on these URLs received from the security agents.

In some examples, the security agents installed on computing devices 202(1)-(N) may be configured to report any URLs that triggered a download of a known-malicious file. For example, a plurality of the security agents installed on computing devices 202(1)-(N) may detect a download of the "maliciousexample.exe" file. In this example, these security agents may search their corresponding download logs for the URL that triggered the download of the "maliciousexample.exe" file.

During the search of their download logs, these security agents may identify the URL that triggered the download of the "maliciousexample.exe" file on their corresponding computing devices. These security agents may then provide each URL that triggered a download of the "maliciousexample.exe" file to security server 206 via network 204. As security server 206 receives these URLs from the security agents, compilation module 104 may compile set of URLs 120 based at least in part on these URLs received from the security agents.

As illustrated in FIG. 4, set of URLs 120 may include various URLs that link to at least one potentially malicious resource (in this example, "http://findfreemediaonline.com/files/7e799757b9854ba457493470d2055b3cdownload.php?get&file_id=gs58ac852ch17i0&advert=149&sub=0&site=206&filename=fade%20out%207%27.zip&name=fade_out_7%27.zip&data=v2NPHHENgqDjv2BTCC1we VZPn1d5miyNt%2BYfjkb8SSNftpoYo7HncblABPHTWs%2Fgc6TV%2BIspzpecN%2FyVII8%2FMg%3D%3D&ip=110.3.37.74&country=JP," "http://a.cloudfiftyfive.com/NCIC/20121204074753494E434647493032_d0e451a4-3f8f-4b17-85b7dbb0f48ff54f%5C201212040906584737f5-0681-4da8-bb54ee86c9470c2e/Setup.exe," "http://4beaf.bablosecures.com/load/secure_2022_brs2.exe," "http://findfreemediaonline.com/files/6eef41e7803152ab0284bdaf98db2b2b/download.php?get&file_id=gs58ac852ch17i0&advert=149&sub=0&site=206&filename=fade%20out%207%27.zip&name=fade_out_7%27.zip&data=8oZEvGwtMK1I7iX8Pu1 9WY2VdbPIf%2BK6XqRLxuQhxjC01ARHramrnDxGv Rd%2F4%2FMd8NAZk04P89nMdrOHorRrTA%3D%3 D&ip=110.3.37.74&country=JP," "http://0005d.bablosecures.com/load/secure_2013_brs8.exe," "http://a.spikey-spikeweed.com/NCIC/20120609132753494E434647493032_a2a2fcc7-f7d5-47ff-9236-d904d66a54e3/2012060917184e7c25fd-20e8-4dc4-bcbf-a65f6e15f8d4/Setup.exe," and so on).

In one example, each URL in set of URLs 120 in FIG. 4 may have triggered a download of the same potentially malicious resource. For example, the "http://4beaf.bablosecures.com/load/secure_2022_brs2.exe" URL may have triggered a download of the "maliciousexample.exe" file on one of computing devices 202(1)-(N). Additionally or alternatively, the "http://0005d.bablosecures.com/load/secure_2013_brs8.exe" URL may have triggered a download of the "maliciousexample.exe" file on another one of computing devices 202(1)-(N). Accordingly, set of URLs 120 may include a single instance of each URL known to have triggered a download of the "maliciousexample.exe" file on a computing device within computing devices 202(1)-(N).

In another example, set of URLs 120 in FIG. 4 may have collectively triggered downloads of different potentially malicious resources. For example, the "http://4beaf.bablosecures.com/load/secure_2022_brs2.exe" URL may have triggered a download of known-malicious file "malware.exe" on one of computing devices 202(1)-(N). Additionally or alternatively, the "http://0005d.bablosecures.com/load/secure_2013_brs8.exe" URL may have triggered a download of known-malicious file "virus.exe" on another one of computing devices 202(1)-(N). Accordingly, set of URLs 120 may include a single instance of various malicious URLs encountered by one or more of computing devices 202(1)-(N).

In some examples, compilation module 104 may group and/or cluster set of URLs 120 into subsets based at least in part on similarity. In one example, compilation module 104 may compare set of URLs 120 with one another. For example, compilation module 104 may compare the "http://4beaf.bablosecures.com/load/secure_2022_brs2.exe" URL with the "http://0005d.bablosecures.com/load/secure_2013_brs8.exe" URL. Compilation module 104 may then determine that the "http://4beaf.bablosecures.com/load/secure_2022_brs2.exe" URL and the "http://0005d.bablosecures.com/load/secure_2013_brs8.exe" URL exceed a threshold level of similarity relative to one another based at least in part on this comparison. In response to determining that the "http://4beaf.bablosecures.com/load/secure_2022_brs2.exe" URL and the "http://0005d.bablosecures.com/load/secure_2013_brs8.exe" URL exceed the threshold level of similarity, compilation module 104 may form a subset of similar URLs that includes these URLs.

In one example, compilation module 104 may use one or more string metrics to perform this comparison on set of URLs 120. The phrase "string metric," as used herein, generally refers to any type or form of metric that measures similarity and/or dissimilarity among a set of strings (such as set of URLs 120). Examples of these string metrics include, without limitation, rules, heuristics, policies, character comparisons, pattern comparisons, Bonnacci distances, Demerau-Levenshtein distances, edit distances, Euclidean distances, Hamming distances, inversion algorithms, Jaccard indexes, Jaro-Winkler distances, Lee distances, Levenshtein distances, overlap coefficients, Sorensen-Dice coefficients, string kernels, string-to-string correction problems, Tversky indexes, Wagner-Fischer algorithms, variations of one or more of the same, combinations of one or more of the same, or any other suitable string metrics.

In response to determining that other URLs in set of URLs 120 exceed the threshold level of similarity relative to one another, compilation module 104 may form other subsets of similar URLs that includes these other URLs. For example, and as illustrated in FIG. 5, subset of similar URLs 500 may include a plurality of URLs from set of URLs 120 (in this example, "http://findfreemediaonline.com/files/7e799757b9854ba457493470d2055b3cdownload.php?get&file_id=gs58ac852ch17i0&advert=149&sub=0&site=206&filename=fade%20out%207%27.zip&name=fade_out_7%27.zip&data=v2NPHHENgqDjv2BTCC1weVZPn1d5miyNt%2BYfjkb8SSNftpoYo7HncblABPHTWs%2Fgc6TV%2BIspzpecN%2FyVII8%2FMg%3D%3D&ip=110.3.37.74&country=JP," "http://findfreemediaonline.com/files/6eef41e7803152ab0284bdaf98db2b2b/download.php?get&file_id=gs58ac852ch17i0&advert=149&sub=0&site=206&filename=fade%20out%207%27.zip&name=fade_out_7%27.zip&data=8oZEvGwtMK1I7iX8Pu1 9WY2VdbPIf%2BK6XqRLxuQhxjC01ARHramrnDxGvRd%2F4%2FMd8NAZk04P89nMdrOHorRrTA%3D%3D&ip=110.3.37.74&country=JP," and so on).

Similarly, and as illustrated in FIG. 5, subset of similar URLs 502 may include a plurality of URLs from set of URLs 120 (in this example, "http://a.cloudfiftyfive.com/NCIC/20121204074753494E434647493032_d0e451a4-3f8f-4b17-85b7-dbb0f48ff54f%5C201212040906584737f5-0681-4da8-bb54-ee86c9470c2e/Setup.exe," "http://a.spikeyspikeweed.com/NCIC/20120609132753494E434647493032_a2a2fcc7-f7d5-47ff-9236-d904d66a54e3/2012060917184e7c25fd-20e8-4dc4-bcbf-a65f6e15f8d4/Setup.exe," and so on).

As illustrated in FIG. 3, at step 304 one or more of the systems described herein may identify a common pattern of characters included in the set of URLs that link to the potentially malicious resource. For example, expression module 106 may, as part of one or more of computing devices 202(1)-(N) and/or security server 206 in FIG. 2, identify a common pattern of characters included in set of URLs 120. In one example, this common pattern of characters may include one or more similar or identical character strings identified in set of URLs 120. Additionally or alternatively, this common pattern of characters may include one or more generic patterns of characters included in set of URLs 120.

The systems described herein may perform step 304 in a variety of ways. In some examples, expression module 106 may search set of URLs 120 for a plurality of URLs that include one or more similar or identical character strings. For example, expression module 106 may identify the "http://4beaf.bablosecures.com/load/secure_2022_brs2.exe" URL in set of URLs 120. Expression module 106 may then search set of URLs 120 for other URLs that include one or more character strings that are similar or identical to at least a portion of the "http://4beaf.bablosecures.com/load/secure_2022_brs2.exe" URL.

During the search of set of URLs 120, expression module 106 may identify the "http://0005d.bablosecures.com/load/secure_2013_brs8.exe" URL. Expression module 106 may then compare the "http://4beaf.bablosecures.com/load/secure_2022_brs2.exe" URL with the "http://0005d.bablosecures.com/load/secure_2013_brs8.exe" URL. Upon comparing these URLs, expression module 106 may determine that both of these URLs include common pattern of characters "http://XXXXX.bablosecures.com/load/secure_20XX_brsX.exe". The character "X," as used in this example, may represent any type or form of character (such as an alphanumeric character) that varied from one URL to the other.

In some examples, expression module 106 may direct and/or enable an expression-derivation tool to identify the common pattern of characters included in set of URLs 120. For example, expression module 106 may provide set of URLs 120 to an expression-derivation tool accessible via the Internet. Upon receiving set of URLs 120, the expression-derivation tool may identify the common pattern of characters during the process of deriving a regular expression based at least in part on set of URLs 120. Examples of this expression-derivation tool include, without limitation, TEXT2RE, REGEXPAL, REGEXTESTER, REGEXMAGIC, REGEXR, RUBULAR, variations of one or more of the same, combinations of one or more of the same, or any other suitable expression-derivation tool.

In some examples, expression module 106 may enable a malware analyst to manually identify the common pattern of characters included in set of URLs 120. For example, expression module 106 may, as part of security server 206 in FIG. 2, direct security server 206 to display set of URLs 120 to a malware analyst. Once the malware analyst has had the opportunity to review set of URLs 120 in the display, the malware analyst may enter user input that identifies the common pattern of characters via a user interface of security server 206. Expression module 106 may receive this user input and then identify the common pattern of characters based at least in part on the user input.

In some examples, expression module 106 may search one or more subsets for a plurality of URLs that include one or more similar or identical character strings. For example, expression module 106 may identify a URL in subset of similar URLs 500 in FIG. 5. Expression module 106 may then search subset of similar URLs 500 for other URLs that include one or more character strings that are similar or identical to at least a portion of the identified URL.

During the search of subset of similar URLs 500, expression module 106 may identify another URL. Expression module 106 may then compare the URL and the other URL identified in subset of similar URLs 500. Upon comparing these URLs, expression module 106 may determine that both of these URLs include characters strings "http://findfreemediaonline.com/files/," "/download.php?get&file_id=gs58ac852ch17i0&advert=149&sub=0&site=206&filename=fad20out%207%27.zip&name=fade_out_7%27.zip&data=," and "%3D%3D&ip=110.3.37.74&country=JP".

In another example, expression module 106 may identify a URL in subset of similar URLs 502 in FIG. 5. Expression module 106 may then search subset of similar URLs 502 for other URLs that include one or more character strings that are similar or identical to at least a portion of the identified URL.

During the search of subset of similar URLs 502, expression module 106 may identify another URL. Expression module 106 may then compare the URL and the other URL identified in subset of similar URLs 502. Upon comparing these URLs, expression module 106 may determine that both of these URLs include characters strings "http://a.," ".com/NCIC/20121204074753494E434647493032_," and "/Setup.exe". Expression module 106 may also determine that both of these URLs include multiple instances of generic pattern "-XXXX-XXXX-XXXX-". The character "X," as used in this example, may represent any type or form of character (such as an alphanumeric character) that varied within the generic pattern from one URL to the other.

The phrase "generic pattern," as used herein, generally refers to any type or form of pattern that includes (1) at least one portion of a character string that is consistent from one URL to another and (2) at least one other portion of the character string that varies from the one URL to the other. In one example, the consistent portion of the generic pattern identified in subset of similar URLs 502 includes 4 dashes (in this example, the "-" character) each separated from one another by 4 variable alphanumeric characters. In this example, the variable portion of the generic pattern identified in subset of similar URLs 502 includes the alphanumeric characters (in this example, the "XXXX" characters) separating each of the 4 dashes from one another.

In some embodiments, the common pattern of characters may be identified in each URL in set of URLs 120. In other embodiments, the common pattern of characters may be identified in each URL in a subset of similar URLs (such as subset of similar URLs 500 or subset of similar URLs 502).

In some examples, expression module 106 may identify a different common pattern of characters for each of the subsets of similar URLs. For example, expression module 106 may identify "http://findfreemediaonline.com/files/," "/download.php?get&file_id=gs58ac852ch17i0&advert= 149&sub=0&site=206&filename=fad20out%207%27.zip& name=fade_out_7%27.zip&data=," and "%3D%3D&ip=110.3.37.74&country=JP" as character strings that are common to each URL in subset of similar URLs 500. Additionally or alternatively, expression module 106 may identify "http://a.," ".com/NCIC/20121204074753494E434647493032_," and "/Setup.exe" as character strings that are common to each URL in subset of similar URLs 502 and "-XXXX-XXXX-XXXX-" as a generic pattern that is common to each URL in subset of similar URLs 502.

As illustrated in FIG. 3, at step 306 one or more of the systems described herein may derive a regular expression capable of being used to identify additional URLs that link to one or more potentially malicious resources based at least in part on the common pattern of characters included in the set of URLs. For example, expression module 106 may, as part of one or more of computing devices 202(1)-(N) and/or security server 206 in FIG. 2, derive regular expression 124 based at least in part on the common pattern of characters included in set of URLs 120. In this example, regular expression 124 may facilitate identifying additional URLs that link to one or more potentially malicious resources.

The systems described herein may perform step 306 in a variety of ways. In some examples, expression module 106 may extract regular expression 124 from set of URLs 120 such that regular expression 124 represents the common pattern of characters included in set of URLs 120. For example, expression module 106 may generate regular expression 124 based at least in part on the "http://4beaf.bablosecures.com/load/secure_2022_brs2.exe" URL and the "http://0005d.bablosecures.com/load/secure_2013_brs8.exe" URL. In this example, regular expression 124 may include and/or represent the "http://XXXXX.bablosecures.com/load/secure_20XX_brsX.exe" common pattern of characters identified in both the "http://4beaf.bablosecures.com/load/secure_2022_brs2.exe" URL and the "http://0005d.bablosecures.com/load/secure_2013_brs8.exe" URL.

In some examples, expression module 106 may direct and/or enable the expression-derivation tool to extract regular expression 124 from set of URLs 120. For example, the expression-derivation tool may derive regular expression 124 based at least in part on the common pattern of characters identified in set of URLs 120. In this example, regular expression 124 may include and/or represent the common pattern of characters identified in set of URLs 120.

In some examples, expression module 106 may enable the malware analyst to manually extract regular expression 124 from set of URLs 120. For example, once the malware analyst has had the opportunity to review set of URLs 120, the malware analyst may enter user input that directs expression module 106 to generate regular expression 124 based at least in part on the common pattern of characters identified in set of URLs 120. Expression module 106 may receive this user input and then generate regular expression 124 in response to the user input. Regular expression 124 may include and/or represent the common pattern of characters identified in set of URLs 120.

In some examples, expression module 106 may extract a different regular expression from each of the subsets of similar URLs. For example, expression module 106 may generate regular expression 600 in FIG. 6 from subset of similar URLs 500. As illustrated in FIG. 6, regular expression 600 may include and/or represent a series of character strings (in this example, "http://findfreemediaonline.com/files/," "/download.php?get&file_id=gs58ac852ch17i0&advert= 149&sub=0&site=206&filename=fad20out%207%27.zip& name=fade_out_7%27.zip&data=," and "%3D%3D&ip=110.3.37.74&country=JP"). Regular expression 600 may facilitate identifying additional URLs that are similar or identical to subset of similar URLs 500.

In another example, expression module 106 may generate regular expression 602 in FIG. 6 from subset of similar URLs 502. As illustrated in FIG. 6, regular expression 602 may include and/or represent a series of character strings (in this example, "http://a.," ".com/NCIC/20121204074753494E434647493032_," and "/Setup.exe") and multiple instances of a generic pattern (in this example, "-XXXX-XXXX-XXXX-"). Regular expression 602 may facilitate identifying additional URLs that are similar or identical to subset of similar URLs 502.

As illustrated in FIG. 3, at step 308 one or more of the systems described herein may identify at least one additional URL that links to at least one potentially malicious resource by applying the regular expression to the additional URL. For example, security module 108 may, as part of one or more of computing devices 202(1)-(N), network 204, and/or security server 206 in FIG. 2, identify URL 126 that links to potentially malicious resource 210 by applying regular expression 124 to URL 126. In one example, potentially malicious resource 210 may represent the same potentially malicious resource linked by and/or accessible via one or more of the URLs in set of URLs 120. In another example, potentially malicious resource 210 may represent a different potentially malicious resource that was not linked by and/or accessible via any of the URLs in set of URLs 120.

The systems described herein may perform step 308 in a variety of ways. In some examples, security module 108 may detect one or more attempts by computing devices 202(1)-(N) to access URL 126 that links to potentially malicious resource 210. For example, security module 108 may, as part of computing device 202(1) in FIG. 2, detect an attempt by the user of computing device 202(1) to access URL 126 via network 204. Additionally or alternatively, security module 108 may, as part of a network gateway (not illustrated in FIG. 2) within network 204 in FIG. 2, detect an attempt by the user of computing device 202(1) to access URL 126 via network 204.

Upon detecting the attempt to access URL 126, security module 108 may apply regular expression 124 to URL 126. For example, security module 108 may compare regular expression 124 with URL 126. In this example, security module 108 may use one or more string metrics to perform this comparison on regular expression 124 and URL 126.

Security module 108 may determine that URL 126 satisfies a threshold level of criteria of regular expression 124 based at least in part on this comparison. Security module 108 may then determine that URL 126 links to at least one potentially malicious resource since URL 126 satisfies the threshold level of criteria of regular expression 124.

Additionally or alternatively, security module 108 may determine that URL 126 satisfies a threshold level of similarity with respect to regular expression 124 based at least in part on this comparison. In response, security module 108 may determine that URL 126 links to at least one potentially malicious resource since URL 126 satisfies the threshold level of similarity with respect to regular expression 124.

In response to determining that URL 126 links to at least one potentially malicious resource, security module 108 may block the attempt by the user of computing device 202(1) to access URL 126. Security module 108 may perform this block of the user's attempt before computing device 202(1) encounters potentially malicious resource 210 hosted by web server 208 via URL 126.

In one example, security module 108 may detect at least one attempt by at least one of computing devices 202(1)-(N) to access URL 700 in FIG. 7. As illustrated in FIG. 7, URL 700 may include a character string that links to at least one resource (in this example, "http://findfreemediaonline.com/files/4d02910397583ae489402874d2984a2c/download.php?get&file_id=gs58ac852ch17i0&advert=149&sub=0&site=206&filename=fade%20out%207%27.zip&name=fade_out_7%27.zip&data=r3MFEUWFpuAio3BOEW2pqVSSm1d4pioNq%4PUtklf9PUQqejlq8amlfkklAEMOFs%4Rml5MN%3PsielmzpV%3PwSil9%4MAc%3D%3D&ip=110.3.37.74&country=JP"). In one example, URL 700 may link to potentially malicious resource 210.

Upon detecting the attempt to access URL 700, security module 108 may apply regular expression 600 to URL 700. For example, security module 108 may search URL 700 for character strings "http://findfreemediaonline.com/files/," "/download.php?get&file_id=gs58ac852ch17i0&advert=149&sub=0&site=206&filename=fad20out%207%27.zip&name=fade_out_7%27.zip&data=," and "%3D%3D&ip=110.3.37.74&country=JP" identified in regular expression 600. During this search, security module 108 may identify each of these character strings in URL 700. Security module 108 may then determine that URL 700 links to at least one potentially malicious resource since URL 700 includes the character strings identified in regular expression 600.

In one example, security module 108 may detect at least one attempt by at least one of computing devices 202(1)-(N) to access URL 702 in FIG. 7. As illustrated in FIG. 7, URL 702 may include a character string that links to at least one resource (in this example, "http://a.spammyspamfile.com/NCIC/20121204074753494E434647493032_s7a353b2-7e5e-6c9a-15c8-ead0d57fc61a%7E201212157803657160a1-1085-2af1-ab55-ce73a8361a2f/Setup.exe"). In one example, URL 702 may link to potentially malicious resource 210.

Upon detecting the attempt to access URL 702, security module 108 may apply regular expression 602 to URL 702. For example, security module 108 may search URL 702 for character strings "http://a.," ".com/NCIC/20121204074753494E434647493032_," and "/Setup.exe" as well as multiple instances of generic pattern "-XXXX-XXXX-XXXX-" identified in regular expression 602. During this search, security module 108 may identify each of these character strings as well as multiple instances of the generic pattern in URL 700. Security module 108 may then determine that URL 702 links to at least one potentially malicious resource since URL 702 includes the character strings and multiple instances of the generic pattern identified in regular expression 602.

Method 300 may also include one or more additional steps (not illustrated in FIG. 3). In some examples, one or more of the systems described herein may testing the regular expression against one or more non-malicious URLs. For example, testing module 110 may, as part of one or more of computing devices 202(1)-(N), network 204, and/or security server 206 in FIG. 2, test regular expression 124 against a set of known non-malicious URLs. The phrase "non-malicious URL," as used herein, generally refers to any type or form of character string that identifies, references, and/or links to at least one non-malicious resource. Upon testing regular expression 124 against the set of known non-malicious URLs, testing module 110 may determine that the test of regular expression 124 resulted in at least one false positive.

In one example, testing module 110 may apply regular expression 124 to at least one known non-malicious URL. For example, testing module 110 may compare regular expression 124 with the known non-malicious URL. In this example, testing module 110 may determine that the known non-malicious URL satisfies a threshold level of criteria of regular expression 124 based at least in part on this comparison. Testing module 110 may then determine that this application of regular expression 124 resulted in a false positive since the known non-malicious URL satisfies the threshold level of criteria of regular expression 124.

In response to determining that this application of regular expression 124 resulted in the false positive, testing module 110 may discard regular expression 124 to avoid false positives resulting from further application of regular expression 124. In other words, testing module 110 may direct security module 108 to refrain from applying regular expression 124 to additional URLs encountered by computing devices 202(1)-(N) since regular expression 124 yielded the false positive.

In some examples, testing module 110 may calculate an amount of false positives that resulted from the test of regular expression 124. For example, testing module 110 may test regular expression 124 against a set of all known non-malicious URLs and all known-malicious URLs. The phrase "malicious URL," as used herein, generally refers to any type or form of character string that identifies, references, and/or links to at least one malicious resource. Upon testing regular expression 124 against the set of known non-malicious and malicious URLs, testing module 110 may calculate the percentage of false positives that resulted from this test. Testing module 110 may then determine that this calculated percentage of false positives exceeds a predetermined threshold.

In response to determining that this calculated percentage of false positives exceeds the predetermined threshold, testing module 110 may discard regular expression 124 to avoid false positives resulting from further application of regular expression 124. In other words, testing module 110 may direct security module 108 to refrain from applying regular expression 124 to additional URLs encountered by computing devices 202(1)-(N) since regular expression 124 yielded a percentage of false positives that exceeds that the predetermined threshold.

As explained above in connection with method 300 in FIG. 3, a security technology may fingerprint the characteristics of malicious resources linked by and/or accessible via malicious URLs. These characteristics of the malicious resources may enable the security technology to generate one or more regular expressions used to identify additional URLs that link to those same malicious resources and/or other malicious resources accessible via the Internet.

For example, the security technology may gather a set of known-malicious URLs from security agents installed on various computing devices within a user community. Upon gathering this set of known-malicious URLs, the security technology may cluster these known-malicious URLs into smaller groups of URLs that exhibit a similar pattern. The security technology may then derive and/or extract a different regular expression for each of the smaller groups of similar URLs.

Upon deriving and/or extracting these regular expressions, the security technology may facilitate applying these regular expressions to the URLs encountered by the computing devices within the user community. For example, the security technology may direct the security agents installed on the computing devices to apply these regular expressions to the URLs encountered by the computing devices. Additionally or alternatively, the security technology may direct a network gateway that facilitates traffic to the user community to apply these regular expressions to the URLs requested by the computing devices. By facilitating the application of the regular expressions in these ways, the security technology may provide continuous protection to the computing devices within the user community and even protect against completely new and/or unknown malware campaigns.

Figure 8:
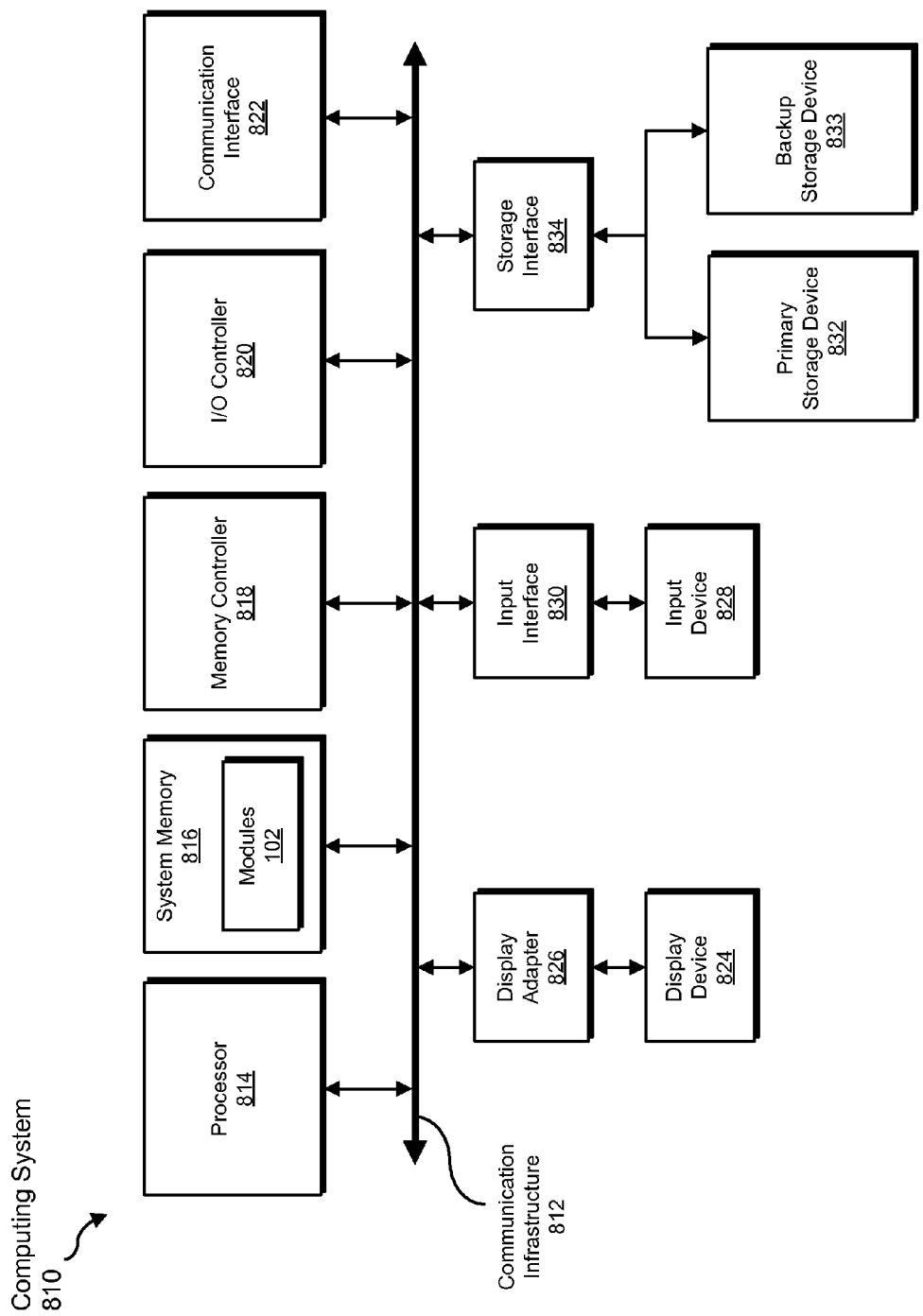
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 810. All or a portion of the computer program stored on the computer-readable-storage medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
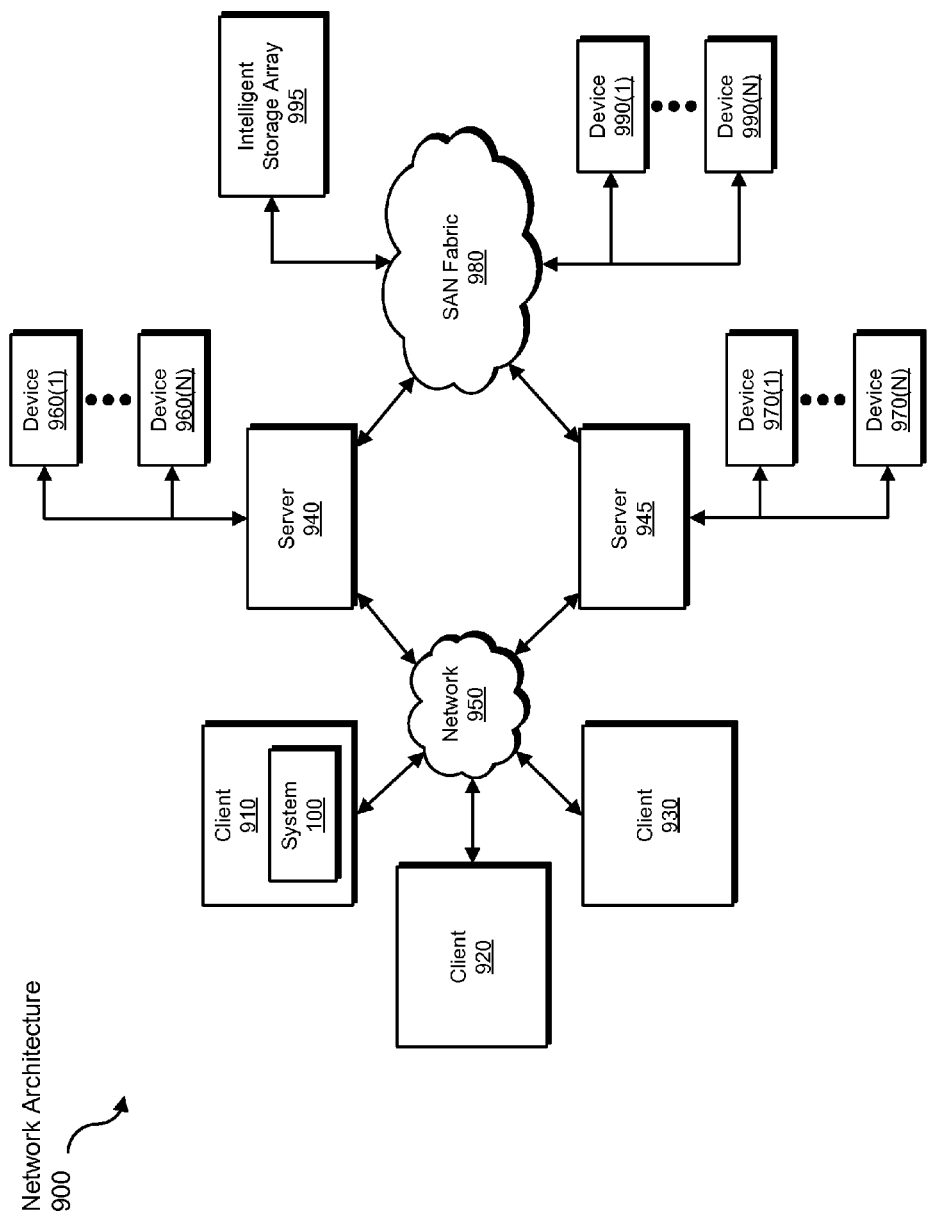
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for identifying URLs that link to potentially malicious resources.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a set of malicious URLs to be transformed, transform the set of malicious URLs, output a result of the transformation to identify a common pattern of characters included in the set of malicious URLs, use the result of the transformation to derive a regular expression based at least in part on the common pattern of characters, and store the result of the transformation to facilitate identifying additional malicious URLs. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying Uniform Resource Locators (URLs) that link to potentially malicious resources, at least a portion of the method being performed by a computing device comprising at least one processor, the method comprising:
    compiling a set of one-time URLs that each facilitate a download of a potentially malicious resource only once in response to a user click performed on a redirection link included in a search result, wherein compiling the set of one-time URLs comprises:
        determining that at least one security agent installed on a set of user devices has encountered the potentially malicious resource via the set of one-time URLs in response to user clicks performed on redirection links included in search results;

identifying each one-time URL at which the security agent installed on the set of user devices has encountered the potentially malicious resource;

compiling the set of one-time URLs to include each one-time URL at which the security agent has encountered the potentially malicious resource;

identifying a common pattern of characters included in the set of one-time URLs that link to the potentially malicious resource, the common pattern of characters comprising a plurality of character strings included in each one-time URL within the set of one-time URLs;

deriving, based at least in part on the plurality of character strings included in each one-time URL within the set of one-time URLs, a regular expression capable of being used to identify additional one-time URLs that each facilitate a download of one or more potentially malicious resources only once;

identifying at least one additional one-time URL that facilitates a download of at least one potentially malicious resource only once in response to an additional user click performed on an additional redirection link included in an additional search result by:

applying the regular expression to the additional one-time URL;

determining that the additional one-time URL links to the potentially malicious resource based at least in part on applying the regular expression to the additional one-time URL.

2. The method of claim 1, further comprising:

detecting at least one attempt by a user device to access the additional URL that links to the potentially malicious resource;

in response to detecting the attempt to access the additional URL, blocking the attempt to access the additional URL before the user device encounters the potentially malicious resource via the additional URL.

3. The method of claim 1, wherein compiling the set of URLs comprises grouping the set of URLs into subsets based at least in part on similarity by:

comparing at least one URL in the set of URLs with at least one other URL in the set of URLs;

determining, based at least in part on the comparison, that the URL and the other URL exceed a threshold level of similarity relative to one another;

in response to determining that the URL and the other URL exceed the threshold level of similarity, forming a subset of similar URLs that includes the URL and the other URL.

4. The method of claim 3, wherein:

identifying the common pattern of characters included in the set of URLs comprises identifying the common pattern of characters included in the subset of similar URLs;

deriving the regular expression capable of being used to identify additional URLs that link to the potentially malicious resource comprises deriving, based at least in part on the common pattern of characters included in the subset of similar URLs, a regular expression capable of being used to identify additional URLs that link to the potentially malicious resource.

5. The method of claim 4, wherein grouping the set of URLs into subsets based at least in part on similarity further comprises:

comparing at least one additional URL in the set of URLs with at least one further URL in the set of URLs;

determining, based at least in part on the comparison, that the additional URL and the further URL exceed a threshold level of similarity relative to one another;

in response to determining that the additional URL and the further URL exceed the threshold level of similarity, forming another subset of similar URLs that includes the additional URL and the further URL.

6. The method of claim 5, wherein:

identifying the common pattern of characters included in the set of URLs comprises identifying the common pattern of characters included in the other subset of similar URLs;

deriving the regular expression capable of being used to identify additional URLs that link to the potentially malicious resource comprises deriving, based at least in part on the common pattern of characters included in the other subset of similar URLs, a regular expression capable of being used to identify additional URLs that link to the potentially malicious resource.

7. The method of claim 1, wherein deriving the regular expression capable of being used to identify additional URLs that link to the potentially malicious resource comprises providing the set of URLs to an expression-derivation tool that derives the regular expression from the set of URLs.

8. The method of claim 1, wherein:

the potentially malicious resource comprises a malicious file;

identifying the additional URL that links to the potentially malicious resource comprises identifying a URL that facilitates downloading the malicious file;

further comprising:

detecting at least one attempt by a user device to access the URL that facilitates downloading the malicious file;

in response to detecting the attempt to access the URL, blocking the attempt to access the URL before the user device downloads the malicious file via the URL.

9. The method of claim 1, further comprising:

testing the regular expression against one or more non-malicious URLs;

upon testing the regular expression against the non-malicious URLs, determining that the test of the regular expression resulted in at least one false positive;

in response to determining that the test of the regular expression resulted in the false positive, discarding the regular expression to avoid false positives resulting from the regular expression.

10. The method of claim 9, wherein:

determining that the test of the regular expression resulted in the false positive comprises:

calculating an amount of false positives that resulted from the test of the regular expression;

determining that the amount of false positives exceeds a predetermined threshold;

discarding the regular expression to avoid false positives comprises refraining from applying the regular expression to additional URLs due at least in part to the amount of false positives that resulted from the test of the regular expression.

11. The method of claim 1, wherein applying the regular expression to the additional URL comprises at least one of:

applying the regular expression at a network layer of a user device;

applying the regular expression at a network gateway.

12. A system for identifying URLs that link to potentially malicious resources, the system comprising:

a compilation module, stored in memory, that compiles a set of one-time URLs that each facilitate a download of a potentially malicious resource only once in response to a user click performed on a redirection link included in a search result, wherein compiling the set of one-time URLs comprises:
  determining that at least one security agent installed on a set of user devices has encountered the potentially malicious resource via the set of one-time URLs in response to user clicks performed on redirection links included in search results;
  identifying each one-time URL at which the security agent installed on the set of user devices has encountered the potentially malicious resource;
  compiling the set of one-time URLs to include each one-time URL at which the security agent has encountered the potentially malicious resource;
an expression module, stored in memory, that:
  identifies a common pattern of characters included in the set of one-time URLs that link to the potentially malicious resource, the common pattern of characters comprising a plurality of character strings included in each one-time URL within the set of one-time URLs;
  derives, based at least in part on the plurality of character strings included in each one-time URL within the set of one-time URLs, a regular expression capable of being used to identify additional one-time URLs that each facilitate a download of one or more potentially malicious resources only once;
a security module, stored in memory, that identifies at least one additional one-time URL that facilitates a download of at least one potentially malicious resource only once in response to an additional user click performed on an additional redirection link included in an additional search result by:
  applying the regular expression to the additional one-time URL;
  determining that the additional one-time URL links to the potentially malicious resource based at least in part on applying the regular expression to the additional one-time URL;
at least one physical processor configured to execute the compilation module, the expression module, and the security module.

13. The system of claim 12, wherein the security module further:
  detects at least one attempt by a user device to access the additional URL that links to the potentially malicious resource;
  blocks the attempt to access the additional URL before the user device encounters the potentially malicious resource via the additional URL.

14. The system of claim 12, wherein the compilation module further groups the set of URLs into subsets based at least in part on similarity by:
  comparing at least one URL in the set of URLs with at least one other URL in the set of URLs;
  determining, based at least in part on the comparison, that the URL and the other URL exceed a threshold level of similarity relative to one another;
  in response to determining that the URL and the other URL exceed the threshold level of similarity, forming a subset of similar URLs that includes the URL and the other URL.

15. The system of claim 14, wherein the expression module further:
  identifies the common pattern of characters included in the set of URLs comprises identifying the common pattern of characters included in the subset of similar URLs;
  derives the regular expression capable of being used to identify additional URLs that link to the potentially malicious resource comprises deriving, based at least in part on the common pattern of characters included in the subset of similar URLs, a regular expression capable of being used to identify additional URLs that link to the potentially malicious resource.

16. The system of claim 12, further comprising a testing module that:
  tests the regular expression against one or more non-malicious URLs;
  determines that the test of the regular expression resulted in at least one false positive;
  discards the regular expression to avoid false positives resulting from the regular expression in response to determining that the test of the regular expression resulted in the false positive.

17. The system of claim 16, wherein the testing module further:
  calculates an amount of false positives that resulted from the test of the regular expression;
  determines that the amount of false positives exceeds a predetermined threshold;
  prevents the regular expression from being applied due at least in part to the amount of false positives that resulted from the test of the regular expression.

18. A non-transitory computer-readable-storage medium comprising one or more computer-executable instructions that, when executed by at least one processor of a computing device, cause the computing device to:
  compile a set of one-time URLs that each facilitate a download of a potentially malicious resource only once in response to a user click performed on a redirection link included in a search result, wherein compiling the set of one-time URLs comprises:
    determining that at least one security agent installed on a set of user devices has encountered the potentially malicious resource via the set of one-time URLs in response to user clicks performed on redirection links included in search results;
    identifying each one-time URL at which the security agent installed on the set of user devices has encountered the potentially malicious resource;
    compiling the set of one-time URLs to include each one-time URL at which the security agent has encountered the potentially malicious resource;
  identifying a common pattern of characters included in the set of one-time URLs that link to the potentially malicious resource, the common pattern of characters comprising a plurality of character strings included in each one-time URL within the set of one-time URLs;
  deriving, based at least in part on the plurality of character strings included in each one-time URL within the set of one-time URLs, a regular expression capable of being used to identify additional one-time URLs that each facilitate a download of one or more potentially malicious resources only once;
  identifying at least one additional one-time URL that facilitates a download of at least one potentially malicious resource only once in response to an additional user click performed on an additional redirection link included in an additional search result by:
    applying the regular expression to the additional one-time URL;

determining that the additional one-time URL links to the potentially malicious resource based at least in part on applying the regular expression to the additional one-time URL.

19. The method of claim 1, wherein applying the regular expression to the additional URL comprises directing the security agent installed on the set of user devices to apply the regular expression to each URL encountered by the set of user devices.

20. The method of claim 1, wherein applying the regular expression to the additional URL comprises directing a network gateway that facilitates traffic to a user community to apply the regular expression to each URL requested by a user device within the user community.

* * * * *